(12) United States Patent
Fukai

(10) Patent No.: US 7,497,442 B2
(45) Date of Patent: Mar. 3, 2009

(54) CYLINDER HEAD GASKET

(75) Inventor: Dai Fukai, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 213 days.

(21) Appl. No.: 11/444,376

(22) Filed: Jun. 1, 2006

(65) Prior Publication Data
US 2006/0273526 A1 Dec. 7, 2006

(30) Foreign Application Priority Data
Jun. 3, 2005 (JP) ............................. 2005-163749

(51) Int. Cl.
*F16F 11/00* (2006.01)
(52) U.S. Cl. ...................... 277/594; 277/595
(58) Field of Classification Search .......... 277/594–595
See application file for complete search history.

(56) References Cited

U.S. PATENT DOCUMENTS

| 2,156,662 | A | * | 5/1939 | Wills | 277/594 |
| 4,791,895 | A | * | 12/1988 | Tittizer | 123/90.12 |
| 5,570,892 | A | * | 11/1996 | Udagawa | 277/595 |
| 6,036,195 | A | * | 3/2000 | Udagawa | 277/595 |
| 6,113,109 | A | * | 9/2000 | Lieb et al. | 277/590 |
| 6,318,733 | B1 | * | 11/2001 | Udagawa | 277/596 |
| 7,017,918 | B2 | * | 3/2006 | Barclay et al. | 277/593 |
| 2005/0093248 | A1 | * | 5/2005 | Udagawa | 277/594 |

FOREIGN PATENT DOCUMENTS

EP  1619425 A1 *  1/2006

\* cited by examiner

*Primary Examiner*—Vishal Patel
(74) *Attorney, Agent, or Firm*—Manabu Kanesaka

(57) ABSTRACT

A cylinder head gasket includes a metal plate having at least one cylinder bore and a plurality of bolt holes arranged around the at least one cylinder bore. A bead is formed on the metal plate to surround the at least one cylinder bore. The bead has at least one pointed shape portion pointed outwardly between two of the bolt holes.

9 Claims, 5 Drawing Sheets

CYLINDER HEAD GASKET

BACKGROUND OF THE INVENTION AND RELATED ART STATEMENT

The present invention relates to a cylinder head gasket to be installed between two members, such as a cylinder head and a cylinder block of an internal combustion, to seal therebetween.

When the joint surfaces of the cylinder head and cylinder block (cylinder body) of an automobile engine is sealed, a metal cylinder head gasket is installed between the cylinder head and cylinder block and seals combustion gas, coolant water, lubricating oil, and so on.

The above-mentioned cylinder head gasket has been changed from a lamination-type metal cylinder head gasket wherein multiple sheets of metal substrates are laminated, to a cylinder head gasket with a simple structure formed by one or two metal substrates for the needs of a lightweight engine, manufacturing cost reduction, and so on. Since the cylinder head gasket is formed by one or two metal plates, and usable materials are also limited in terms of the lightweight engine, the type and number of sealing means are also limited. As a result, a relatively simplified sealing means has to be used.

Also, in recent lightweight and small-sized engines, engine rigidity has been decreased, so that in the sealing of the cylinder head gasket, providing a uniform sealing surface pressure around a cylinder bore has become difficult. More specifically, due to a structural problem around the cylinder bore of an engine member, when the gasket is tightened, there is a shortage of sealing surface pressure at the portion where the rigidity is weak. As a result, there has been a number of gas leaks in the portion where the rigidity is weak.

When even a small amount of the leaked gas penetrates a water hole or oil hole, the circulation of water or oil is blocked due to the invasion of the gas in a liquid such as water, oil, and so on. This blockage interferes with the cooling of the engine, and causes engine trouble, so that adequate measures are required.

On the one hand, when a large sealing surface pressure is provided in the nearest peripheral part of the cylinder bore in order to assure the sealing performance of the bore, the deformation of the cylinder bore with low rigidity is accelerated, and the sealing means of the gasket does not function well. As a result, it is difficult to achieve adequate sealing performance.

Most of the gas leakages of the cylinder head gasket occur between the bores which are the portions where the load by a tightening bolt becomes weak; and on the exhaust side. More specifically, while the area of a tightening bolt hole has a large tightening load and generates excessive sealing surface pressure, the sealing surface pressure in other parts is reduced more for that, and the overall surface pressure distribution becomes unequal. The occurrence of the portion where the surface pressure is weak in the unequal surface pressure distribution causes the leakage of the combustion gas.

In order to solve the above-mentioned problem, a metal laminate gasket is proposed, wherein the width of a metal ring being inserted into a folded portion (grommet) of the cylinder bore is formed widely in such a way as to project near the tightening bolt hole from the folded portion rather than between the tightening bolt holes. The metal laminate gasket generates a well-balanced surface pressure distribution by dispersing a tightening load due to the tightening of the tightening bolt (for example, refer to Japanese Patent Publication 1).

However, although this structure has the effect of adjusting the surface pressure distribution in the folded portion, the surface pressure distribution in the bead portion cannot be adjusted.

Also, a meandering-shape portion such as a wave shape and so on in a plan view may be provided between the tightening bolt holes in the circumferential direction of the bead around the cylinder bore. However, in this case, there are problems that relatively high construction accuracy is required for a metal mold for forming the meandering portion; and the folded portion cannot be provided around the cylinder bore due to the obstacle of the meandering portion.

[Patent Document 1] Japanese Patent Publication No. 10-252894

The present invention is made in order to solve the above-mentioned problems, and the object of the invention is to provide a cylinder head gasket being able to improve the sealing surface pressure between the cylinder bores or in the intermediate portion between the tightening bolt holes on the exhaust side wherein the sealing performance of the cylinder head gasket is easily lowered, in a relatively simple structure.

Further objects and advantages of the invention will be apparent from the following description of the invention.

SUMMARY OF INVENTION

In order to achieve the above-mentioned object, a cylinder head gasket of the present invention is constituted as follows. In a single plate metal cylinder head gasket provided with a bead for sealing around a cylinder bore, or a lamination-type metal cylinder head gasket including a metal substrate with the bead, the intermediate portion between tightening bolt holes is partly formed in a pointed shape on the outside in a plan view with respect to the circumferential direction of the bead.

Incidentally, the above-mentioned pointed shape is expressed against the shape of a conventional bead formed in a concentric circle around the cylinder bore, and does not necessarily mean that the pointed shape has an acute angle portion, and means that the pointed shape includes an angle portion relative to a circumferential shape.

According to the structure, the bead between the tightening bolt holes where the surface pressure is easily lowered is partly formed in the pointed shape to the outside in a plan view with respect to the circumferential direction of the bead. As a result, the length of a seal bead of the above-described portion can be made longer in a relatively simple structure, so that the pressure receiving area of the bead can be made larger. Accordingly, the creep relaxation (permanent set in fatigue) of the pointed-shape portion becomes smaller than that of an arc-shaped bead in a usual plan view. Therefore, even between the cylinder bores where heat and so on are high and the sealing condition is bad, or in the portion of an exhaust side, excellent sealing performance can be maintained, and the sealing can be strengthened by using this structure.

Especially, through a structure with the pointed shape, compared to the case of being partly formed in a meandering portion such as a wave shape and so on in a plan view, the structure is simplified and eliminates the need for a metal mold with high accuracy. Furthermore, if the width of a folding back portion can be obtained, the folding back portion can be provided around the cylinder bore, or a bore bead ring can be built in.

Also, in the case that the pointed-shape portions are provided between all the tightening bolt holes, the tightening bolt holes are arranged in each of the intermediate positions of the pointed-shape portions in the circumferential direction of the bead. As a result, unevenness of the received surface pressures over the entire circumference of the bead is reduced.

Also, in the cylinder head gasket, if the pointed-shape portion of the bead is provided between abutting cylinder bores or if, in the cylinder head gasket, the pointed-shape portion of the bead is provided on the exhaust side, although these portions have relatively small surface pressures being generated by the tightening of the tightening bolts, the pointed-shaped portions of the bead have a profound effect.

In addition, in the cylinder head gasket, the angle of the edge of the pointed-shaped portion of the bead is within a range of 90-170 degrees. If the angle is over 90 degrees, the projecting amount of a pointed extremity is also small, so that the pointed-shape portion is easily arranged even between the cylinder bores. If the angle is below 170 degrees, the sealing effect of sharpening the edge becomes large, so that adopting the above-mentioned structure has a profound effect.

Moreover, in the cylinder head gasket, if a front edge location of the pointed-shape portion of the bead is located between a straight line connecting the outside of the tightening bolt holes on the two sides, and a straight line connecting the inside of the tightening bolt holes on the two sides, the pointed-shape portion is located in the portion where the surface pressure becomes the highest among the intermediate portion of the tightening bolt holes where the surface pressure becomes low. Accordingly, the pressure receiving surface of the bead forming a sealing line can be arranged so that the effect becomes larger.

Incidentally, usually, a full bead with a circular arc is used for the cross-sectional shape of the bead for sealing around the cylinder bore of the invention. However, a full bead with a cross-sectional shape of a trapezoidal shape or other shapes may be used. Also, a bead other than the full bead such as a half bead and so on may be used. Moreover, the shape pointing outside in the plan view may have a linear shape or a combination of a curved line such as an arc and so on. The bottom portion of the pointed shape is connected to an arc-shaped portion along the bottom portion in the plan view. However, the bottom portion is preferably formed in such a way as to be smoothly connected to the periphery of the arc shape.

According to the cylinder head gasket of the invention, the pointed-shape portion of the bead provided between the cylinder bores increases the pressure receiving portion, so that the sealing surface pressure between the cylinder bores, or in the intermediate portion of the tightening bolt holes on the exhaust side where the sealing performance of the cylinder head gasket can be easily lowered can be improved in the relatively simple structure.

DETAILED DESCRIPTION OF PREFERRED EMBODIMENTS

Figure 1:
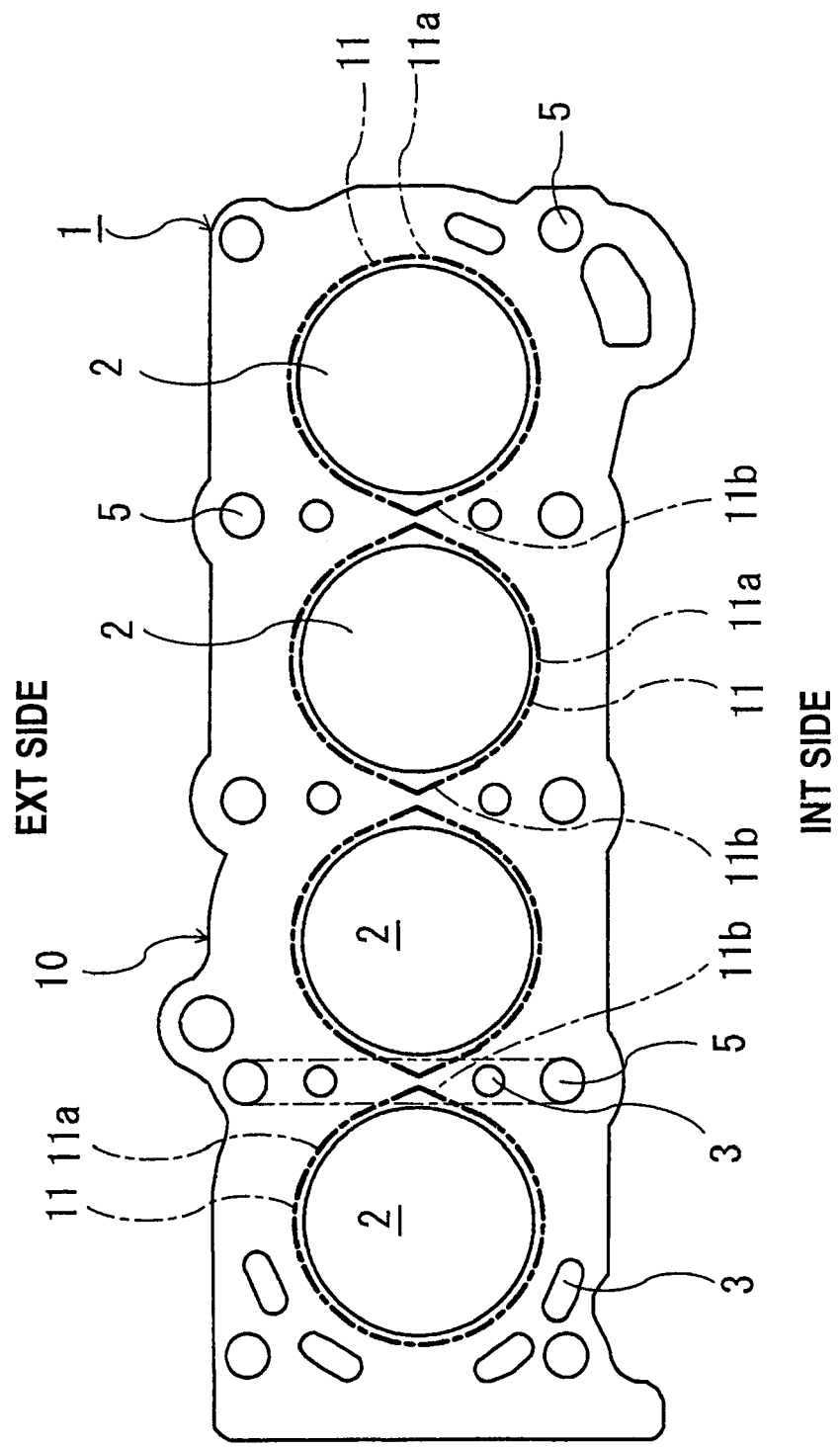
FIG. 1 is a plan view showing a cylinder head gasket of a first embodiment of the present invention.

Hereinafter, embodiments of a cylinder head gasket of the present invention are explained with reference to the drawings.

Cylinder head gaskets 1, 1A, 1B, 1C of the embodiments of the present invention shown in FIGS. 1-4 are a metal gasket installed between a cylinder head and a cylinder block (cylinder body) for an engine. The gasket seals high-temperature and high-pressure combustion gas, and liquid such as coolant water in a passage for coolant water or oil in a passage for cooling oil, and so on in a cylinder bore.

Incidentally, FIGS. 1-4 are explanatory drawings shown by changing the horizontal to vertical ratio of the metal laminate gaskets 1, 1A, 1B, and the number, width, or horizontal to vertical ratio of the waveform of the wave shape of a bead in a plan view from real sizes in order to understand easily.

The cylinder head gaskets 1-1C of the embodiments of the present invention shown in FIGS. 1-4 are constituted by metal substrates 10~10C, respectively. Each of the metal substrates 10~10C is formed by a stainless annealed material (anneal material) or mild steel plate, and so on, and manufactured in accordance with the shape of an engine member such as a cylinder block and so on. Also, cylinder bores 2, water holes 3 for coolant water, oil holes 4 (not shown) for circulating engine oil, and tightening bolt holes 5 for tightening a bolt are formed. In addition, beads 11-11C formed by full beads around the respective cylinder bores 2 are provided as sealing means. Each bead 11 surrounds each cylinder bore 2.

In a first embodiment, the bead 11 has a partly pointed shape in a circumferential direction in the plan view between the cylinder bores 2, and only in an intermediate portion 11b between the tightening bolt holes 5. A portion 11a other than the intermediate portion 11b is formed in a circular arc shape along the cylinder bore 2 in the plan view.

According to the structure, since the pressure receiving area of the pointed-shaped portion 11b of the bead 11 provided between the cylinder bores 2 increases, the sealing surface pressure in the portion where the sealing performance can be easily lowered between the cylinder bores 2 of the cylinder head gasket 1 can be improved in a relatively simple structure.

Figure 2:
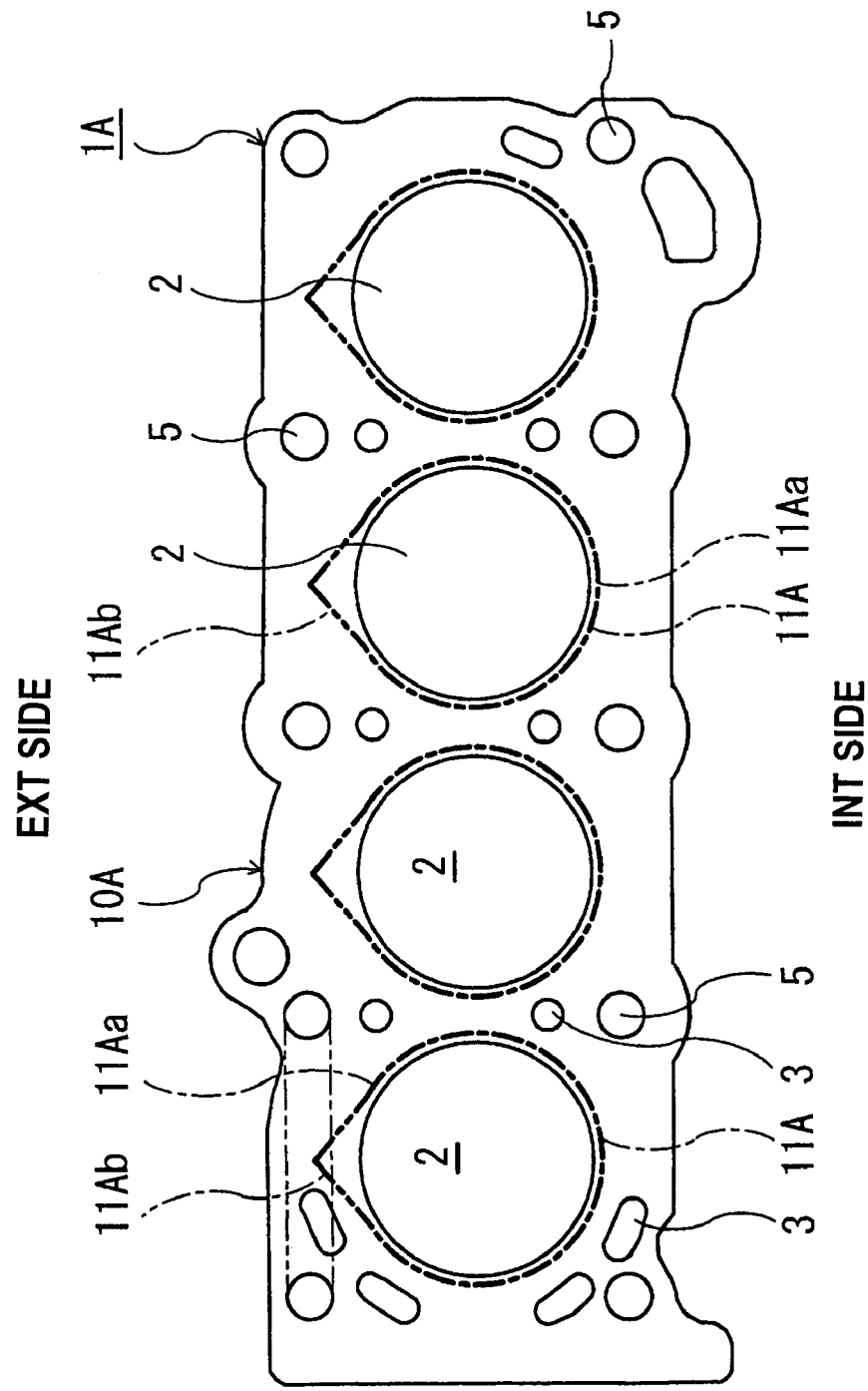
FIG. 2 is a plan view showing the cylinder head gasket of a second embodiment of the present invention.

In a second embodiment, as shown in FIG. 2, in each bead 11A for sealing each cylinder bore 2 of the metal substrate 10A, only an intermediate portion 11Ab between the tightening bolt holes 5 on the exhaust side (EXT side) is formed in a partially pointed shape in the plan view. A portion 11Aa other than the intermediate portion 11Ab is formed in a circular arc shape along the cylinder bore 2 in the plan view.

According to the structure, on the exhaust side (EXT side) where the sealing performance can be easily lowered due to a high temperature compared to the temperature on the intake side (INT side), the pressure receiving area of the pointed-shaped portion 11Ab of the bead 11A provided between the cylinder bores 2 increases, so that the sealing surface pressure in the portion where the sealing performance can be easily lowered between the tightening bolt holes 5 on the exhaust side (EXT side) can be improved in the relatively simple structure.

Figure 3:
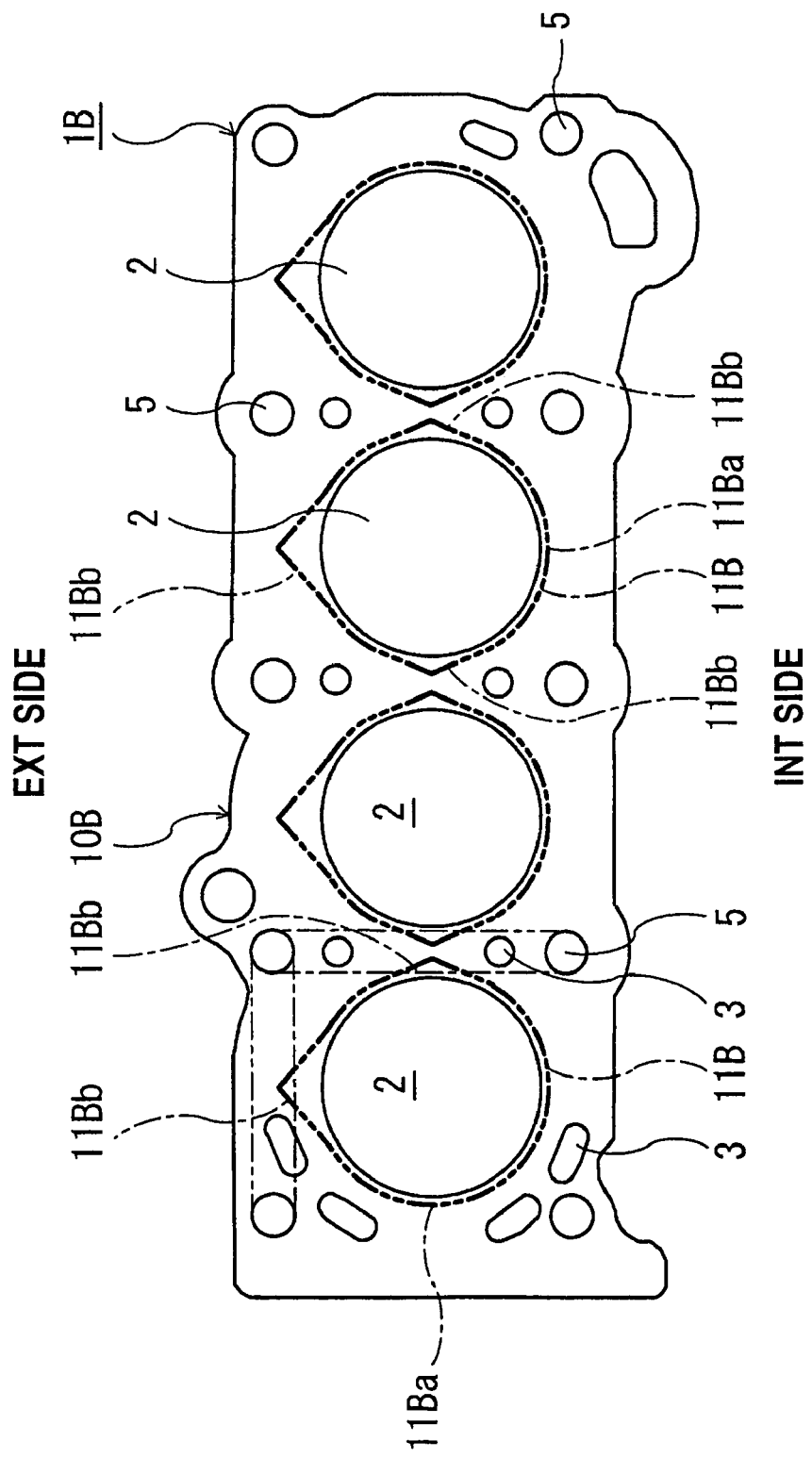
FIG. 3 is a plan view showing the cylinder head gasket of a third embodiment of the present invention.

In a third embodiment, as shown in FIG. 3, in each bead 11B for sealing each cylinder bore 2 of the metal substrate 10B, both of the intermediate portions 11Bb, i.e. between the cylinder bores 2, and between the tightening bolt holes 5 on the exhaust side (EXT side) have a partly pointed shape in the plan view. Portions 11Ba other than the intermediate portions 11Bb are formed in a circular arc shape along each cylinder bore 2 in the plan view.

According to the structure, since the pressure receiving areas of the pointed-shaped portions 11Bb of the bead 11B provided between the cylinder bores 2 and on the exhaust side (EXT side) increase, the sealing surface pressure in the portions where the sealing performance is easily lowered between the cylinder bores 2 and the tightening bolt holes 5 on the exhaust side (EXT side) of the cylinder head gasket 1B can be improved in the relatively simple structure.

Figure 4:
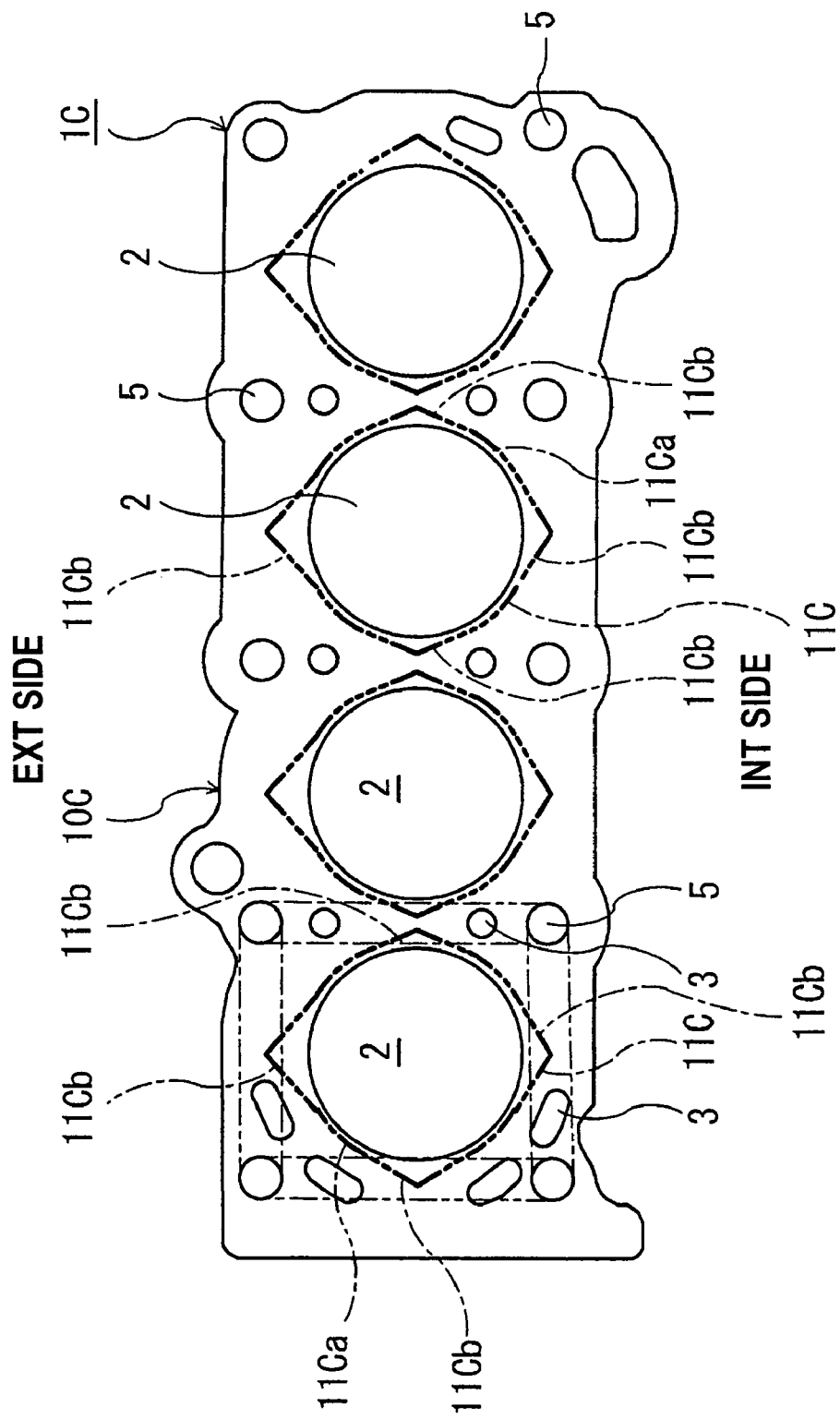
FIG. 4 is a plan view showing the cylinder head gasket of a fourth embodiment of the present invention.

In a fourth embodiment, as shown in FIG. 4, in the bead 11C for sealing each cylinder bore 2 of the metal substrate 10C, intermediate portions 11Cb of the four tightening bolt holes 5 are formed in a partly pointed shape in the plan view. Portions 11Ca other than the intermediate portions 11Cb are formed in a semi circular arc shape along each cylinder bore 2 in the plan view.

According to the structure, since the pressure receiving areas of the pointed-shaped portions 11Cb of the bead 11C provided between the respective tightening bolt holes 5 increase, the sealing surface pressure in the portions where the sealing performance is easily lowered between the tightening bolt holes 5 of the cylinder head gasket 1C can be improved in the relatively simple structure.

Incidentally, usually, a full bead with a circular arc cross-sectional shape is used for the beads 11-11C for sealing around the cylinder bores 2. However, beads are not limited to the circular arc full bead, and a full bead with a cross-sectional shape of a trapezoidal shape or other shapes may be used. Also, a bead other than the full bead such as a half bead may be used. Moreover, the shape pointing outside relative to the cylinder bore 2 in the plan view may have a linear shape or a combination of a curved line such as an arc and so on. The bottom portions of the pointed shape are connected to arc-shaped portions along the bottom portions in the plan view. However, the bottom portions are preferably formed in such a way as to be smoothly connected to the periphery of the arc shape.

Figure 5:
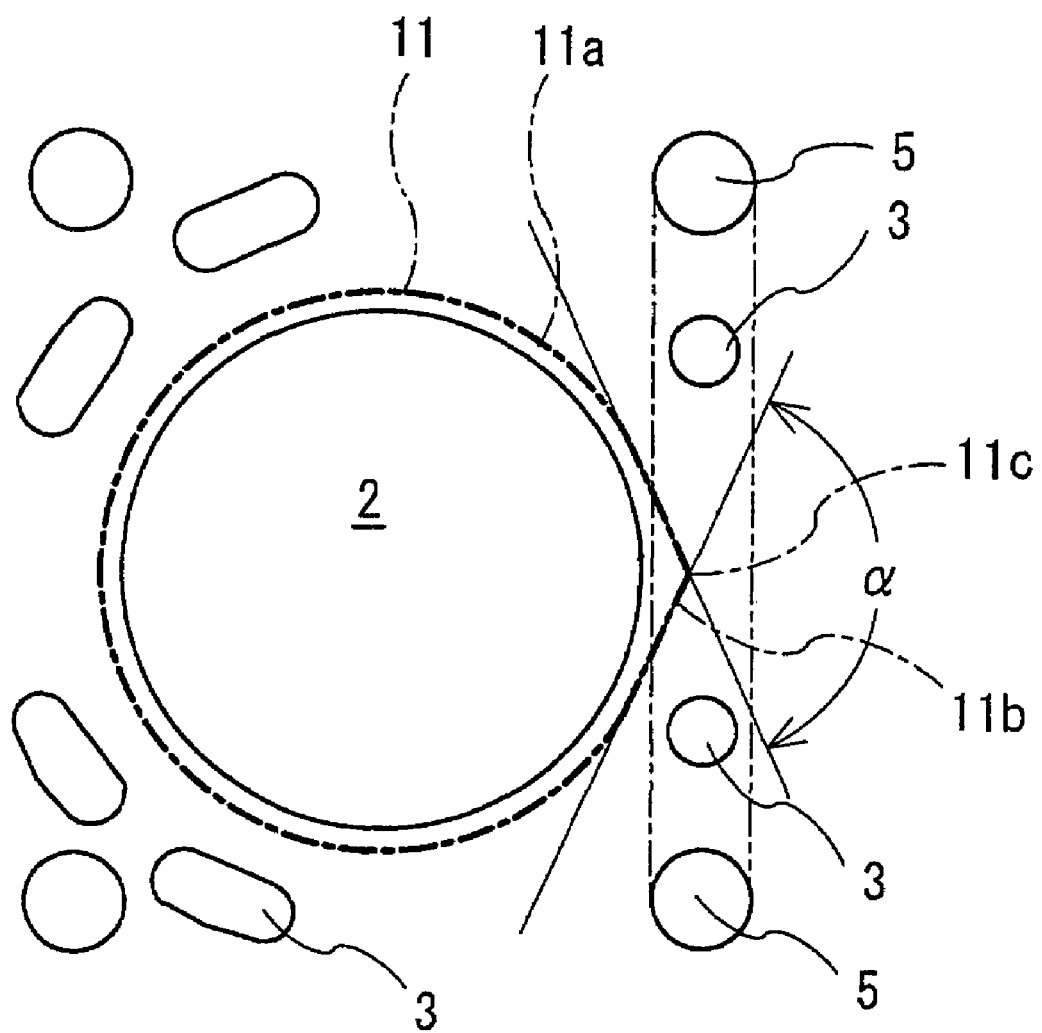
FIG. 5 is an enlarged plan view of one bead in FIG. 1.

In a shape of the pointed-shape portions 11b, 11Ab, 11Bb, 11Cb in the plan view, an angle α of an edge is preferably within a range of 90-170 degrees as exemplified in FIG. 5. If the angle a is over 90 degrees, the projecting amount of a pointed extremity is also small, so that the pointed-shape portions are easily arranged even between the cylinder bores 2. If the angle a is below 170 degrees, the sealing effect of sharpening the edge is large, so that adopting the above-mentioned structure has a profound effect.

Additionally, as exemplified in FIG. 5, if a front edge location 11c of the pointed-shape portion 11b of the bead 11 is located between a straight line (dashed-dotted line) connecting the outside of the tightening bolt holes 5 on the two sides, and a straight line (dashed-two dotted line) connecting the inside of the tightening bolt holes 5 on the two sides, the pointed-shaped portion 11b is located in the portion where the surface pressure becomes the highest among the intermediate portion of the tightening bolt holes where the surface pressure becomes low. Accordingly, the pressure receiving surface of the bead 11 forming a sealing line can be arranged so that the effect becomes larger.

According to the cylinder head gaskets 1-1C of the first to fourth embodiments of the above-mentioned structure, the pointed-shape portions 11b-11Cb of the beads 11-11C are provided between the tightening bolt holes 5, and the pressure receiving areas of the beads 11-11C increase. As a result, the beads can endure high tightening pressure and provide sealing performance with excellent anti-creep relaxation.

Therefore, the sealing surface pressure of the intermediate portions 11b-11Cb between the cylinder bores 2 or between the tightening bolt holes 5 on the exhaust side (EXT side) where the sealing performance of the cylinder head gaskets 1-1C can be easily lowered can be improved in the relatively simple structure.

Incidentally, in the above-mentioned embodiments, a single plate metal cylinder head gasket formed by a single metal substrate is explained. However, the present invention can be also applied to a lamination-type metal cylinder head gasket where multiple sheets of metal substrates are laminated.

The disclosure of Japanese Patent Application No. 2005-163749 filed on Jun. 3, 2005 is incorporated as a reference.

While the invention has been explained with reference to the specific embodiments of the invention, the explanation is illustrative, and the invention is limited only by the appended claims.

What is claimed is:

1. A cylinder head gasket comprising:
   a metal plate having at least one cylinder bore and a plurality of bolt holes arranged around the at least one cylinder bore and
   at least one bead formed on the metal the metal plate, said at least one bead surrounding only one cylinder bore, said at least one bead having at least one pointed-shape portion extending laterally outwardly from other portion, the at least one pointed-shape portion having two intermediate portions with a point therebetween and only one pointed-shape portion being located in a middle between two of the bolt holes adjacent to each other so that a distance of the at least one pointed-shape portion from the cylinder bore increases from the intermediate portions to the point therebetween, said other portion of the bead other than the at least one pointed-shape portion extending along the cylinder bore without a projection.

2. A cylinder head gasket according to claim 1, wherein said bead has a circular shape except for the at least one pointed shape portion.

3. A cylinder head gasket according to claim 1, wherein the pointed-shape portion of the bead is provided in a portion between two adjacent cylinder bores.

4. A cylinder head gasket according to claim 3, wherein the pointed-shape portions of the beads formed around said two adjacent cylinder bores face each other.

5. A cylinder head gasket according to claim 1, wherein the pointed-shape portion of the bead is provided on an exhaust side of the metal plate.

6. A cylinder head gasket according to claim 1, wherein the pointed-shape portion is provided in every portion between two of the bolt holes.

7. A cylinder head gasket according to claim 1, wherein the pointed-shape portion has an angle within a range of 90-170 degrees.

8. A cylinder head gasket according to claim 1, wherein said bead includes four pointed-shape portions substantially equally spaced apart from each other.

9. A cylinder head gasket according to claim 1, wherein the metal plate has an intermediate area defined between an outer side line connecting outer sides of two bolt holes and an inner side line connecting inner sides of the two bolt holes, said pointed-shape portion being located in said intermediate area.

* * * * *

UNITED STATES PATENT AND TRADEMARK OFFICE
CERTIFICATE OF CORRECTION

PATENT NO. : 7,497,442 B2  Page 1 of 1
APPLICATION NO. : 11/444376
DATED : March 3, 2009
INVENTOR(S) : Dai Fukai It is certified that error appears in the above-identified patent and that said Letters Patent is hereby corrected as shown below:

Please change column 6, line 21, "the metal the metal" to -- the metal --.

Signed and Sealed this

Second Day of June, 2009

JOHN DOLL
*Acting Director of the United States Patent and Trademark Office*